(12) United States Patent
Bassett (10) Patent No.: US 9,506,357 B1
(45) Date of Patent: Nov. 29, 2016

(54) TURBOMACHINE STAKING TOOL (71) Applicant: General Electric Company, Schenectady, NY (US)

(72) Inventor: Brian Kenneth Bassett, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/962,253

(22) Filed: Dec. 8, 2015

(51) Int. Cl.
| | |
|---|---|
| *B21K 25/00* | (2006.01) |
| *F01D 5/32* | (2006.01) |
| *F01D 5/30* | (2006.01) |
| *F16C 35/067* | (2006.01) |
| *F16H 41/28* | (2006.01) |
| *F16C 43/04* | (2006.01) |
| *F16B 39/02* | (2006.01) |

(52) U.S. Cl.
CPC .............. *F01D 5/323* (2013.01); *B21K 25/00* (2013.01); *F01D 5/3015* (2013.01); *F16B 39/02* (2013.01); *F16C 35/067* (2013.01); *F16C 43/04* (2013.01); *F16H 41/28* (2013.01); *F05D 2220/32* (2013.01); *F05D 2230/60* (2013.01); *F05D 2240/30* (2013.01); *F05D 2260/30* (2013.01)

(58) Field of Classification Search
CPC ...... F16C 43/04; F16C 35/067; F16H 41/28; F16B 39/02; F01D 5/323; F01D 5/3015; B21K 25/00; F05D 2220/32; F05D 2240/30; F05D 2260/30; F05D 2230/60

USPC .......................................................... 72/441
See application file for complete search history.

(56) References Cited

U.S. PATENT DOCUMENTS

| | | | | |
|---|---|---|---|---|
| 2,485,954 | A | * | 10/1949 | Burrell ..................... F16B 39/02 29/243.5 |
| 2,944,326 | A | | 7/1960 | Stadthaus |
| 3,956,801 | A | * | 5/1976 | Wood ..................... F16C 35/067 29/275 |
| 4,133,091 | A | * | 1/1979 | Ito ........................... F16H 41/28 29/243.5 |
| 8,142,161 | B2 | | 3/2012 | Prince et al. |
| 8,727,733 | B2 | | 5/2014 | Thermos et al. |
| 8,764,402 | B2 | | 7/2014 | Agaram et al. |
| 2011/0158819 | A1 | | 6/2011 | Mani et al. |
| 2016/0175919 | A1 | * | 6/2016 | Jacobs ..................... F16C 43/04 29/509 |

FOREIGN PATENT DOCUMENTS

EP          1081337 A2      3/2001

* cited by examiner

*Primary Examiner* — David B Jones
(74) *Attorney, Agent, or Firm* — James W. Pemrick; Ernest G. Cusick; Frank A. Landgraff (57) ABSTRACT

A staking tool includes an assembly having two substantially parallel punch members. The punch members are located partially in a punch body, and the punch body is located adjacent to a lower shaft. The lower shaft has an angled face configured to contact the punch body so that an angle is formed between the punch body and lower shaft. A main shaft is connected to the lower shaft. A cap is connected to the main shaft. A blow applied to the cap transfers force to the punch body, and the angled face redirects the direction of the force by the angle.

22 Claims, 12 Drawing Sheets

TURBOMACHINE STAKING TOOL

BACKGROUND OF THE INVENTION

The apparatus described herein relates generally to a staking tool. More specifically, the apparatus relates to a staking tool that can simultaneously stake a twist-lock device in two places within a confined space in a turbomachine.

Gas turbines generally include a compressor rotor having a number of stages. Air flowing into the compressor is compressed at each stage. Each stage includes a number of rotor blades mounted to a rim of a rotor wheel in a spaced relationship. A typical compressor rotor may have dozens of rotor blades mounted thereon. A turbine section also has a number of stages, and a number of rotor blades are mounted to a rotor wheel in a spaced relationship. Nozzles are located between the turbine's rotor stages and one pair of adjacent blades and nozzles makes up a stage of the turbine section. As examples only, a turbine section may have three or four stages, and the space between neighboring rotor blade stages is limited. This limited or confined space makes it difficult to work on the rotor blade stage.

Generally described, each blade may have a dovetailed portion that interlocks with a dovetail region of the wheel to secure the blade to the rotor. The blade dovetails may be designed to cooperate with a twist-lock device that secures the blade to the rotor. The twist-lock device is installed in the dovetail of the wheel first and then the blade is installed. The twist-lock device is then rotated 180 degrees to prevent the blade from moving axially. The head of the twist-lock must then be staked to prevent it from rotating. This process is then repeated for each rotor blade for each rotor stage.

Staking becomes difficult in specific stages due to the confined space. For example, in stages two and three there is only a small distance between the stage three rotor blade/wheel and the preceding stage two rotor blade/wheel. This limited distance makes it very difficult, if not impossible, to strike a staking tool with a hammer while both rotor blade stages are present. The length of the staking tool plus the length of the hammer is often close to or greater than the length of the stage-to-stage distance, making a suitable hammer swing impossible. In many cases it is unfeasible, undesired or uneconomical to remove the preceding stage's rotor blades when staking the forward side of the twist-locks. In addition, for the last stage it may also be impractical to remove the exhaust frame or associated exhaust elements if one desires to stake the aft side of the last stage's twist-locks.

BRIEF DESCRIPTION OF THE INVENTION

In an aspect of the present invention, a staking tool includes an assembly having two substantially parallel punch members. The punch members are located partially in a punch body, and the punch body is located adjacent to a lower shaft. The lower shaft has an angled face configured to contact the punch body so that an angle is formed between the punch body and lower shaft. A main shaft is connected to the lower shaft. A cap is connected to the main shaft. A blow applied to the cap transfers force to the punch body, and the angled face redirects the direction of the force by the angle.

In another aspect of the present invention, a staking tool includes an assembly having at least one punch member. The punch member is located partially in at least one punch body. The punch body is located adjacent to a lower shaft, and the lower shaft has an angled face configured to contact the punch body so that an angle is formed between the punch body and lower shaft. A main shaft is connected to the lower shaft, and a cap is connected to the main shaft. A blow applied to the cap transfers force to the punch body, and the angled face redirects the direction of the force by the angle.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
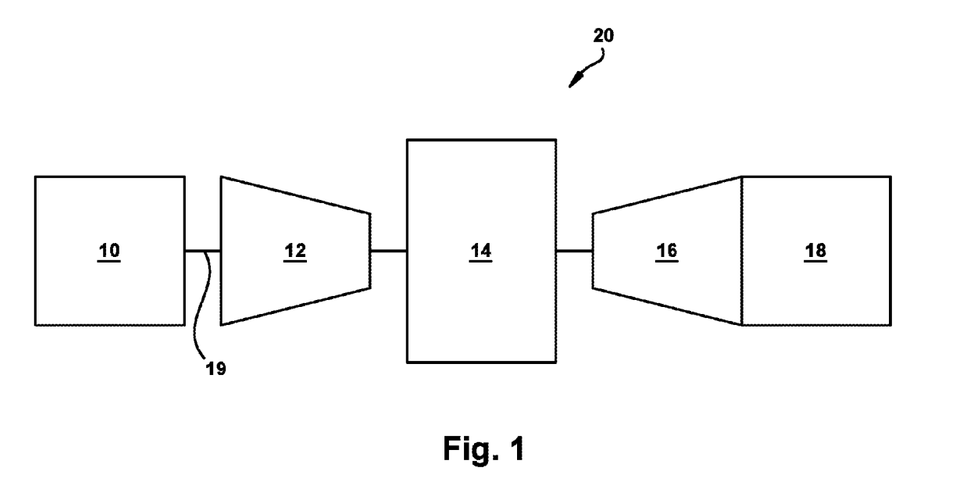
FIG. 1 is a schematic block diagram of a turbomachine.

FIG. 1 is a schematic block diagram of a turbomachine 20. The turbomachine 20 may typically include a load 10 (e.g., a generator), a compressor 12, a combustor 14, a turbine 16 and an exhaust section 18. The load 10, compressor 12 and turbine 16 are all connected to a shaft 19. The compressor 12 compresses air and directs it into the combustor 14. The combustor 14 mixes the compressed air with fuel and then ignites this mixture. The expanding gases are then directed into turbine 16 which drives shaft 19. As mentioned previously, the turbine section 16 typically includes a plurality of stages, and each stage includes a plurality of rotor blades and a plurality of nozzles. The compressor 12 also has a plurality of stages, but typically many more stages than the turbine. As one example only, the compressor may have 14 stages while the turbine has 3 stages.

Figure 2:
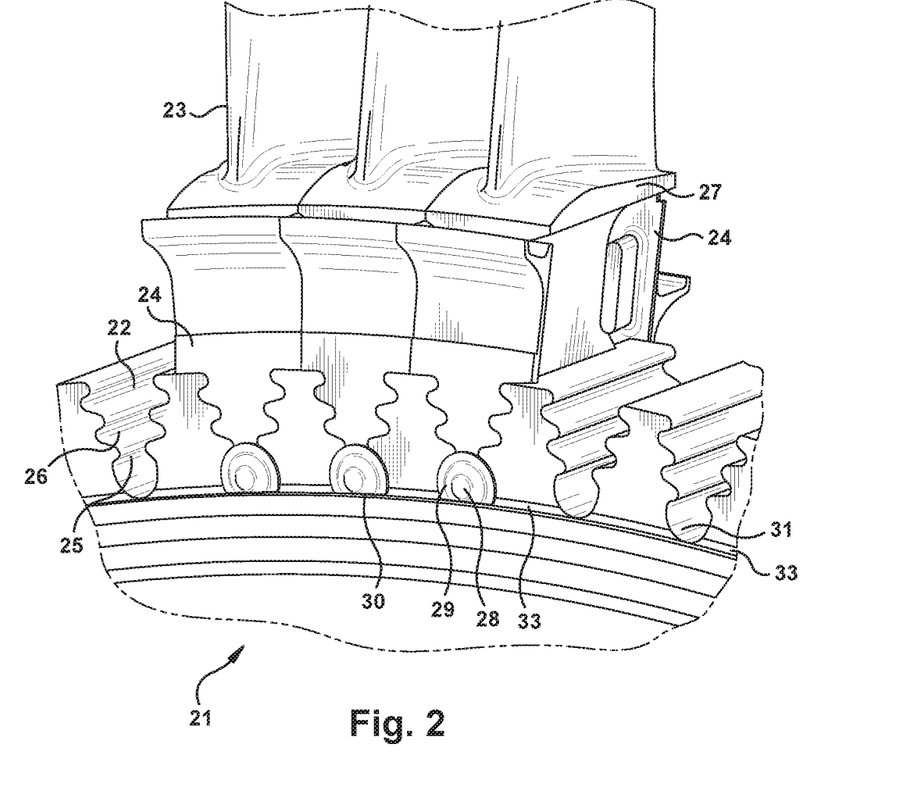
FIG. 2 illustrates a partial perspective view of a stage in the turbine section of the turbomachine.

FIG. 2 illustrates a partial perspective view of a stage in the turbine section 16. A turbine wheel 21 has a plurality of circumferentially spaced slots 22 for receiving generally complementary-shaped projections on the inner ends of the turbine blades 23 and coverplates 24 therefor. The slots 22, as illustrated, have circumferentially extending bosses and grooves 25 and 26, respectively, and are sometimes referred to as dovetail or pine tree-configured slots. It will be appreciated that an array of blades and covers are provided about the turbine wheel 21 at circumferentially spaced positions and are secured to the wheel 21 for rotation therewith about the axis of the rotor. As illustrated, each blade 23 includes a dovetail section generally complementary in shape to the shape of the slots 22. The blades 23 are of the axial entry type whereby the dovetail is received in an axial direction in the wheel slot 22. It will also be appreciated that the blades 23 form a circumferential array thereof about the rim of the wheel 21 with the platforms 27 lying contiguous to one another. The coverplates 24 overlie axial end faces of the blade dovetail and shank along axially opposite sides of the turbine wheel.

Figure 3:
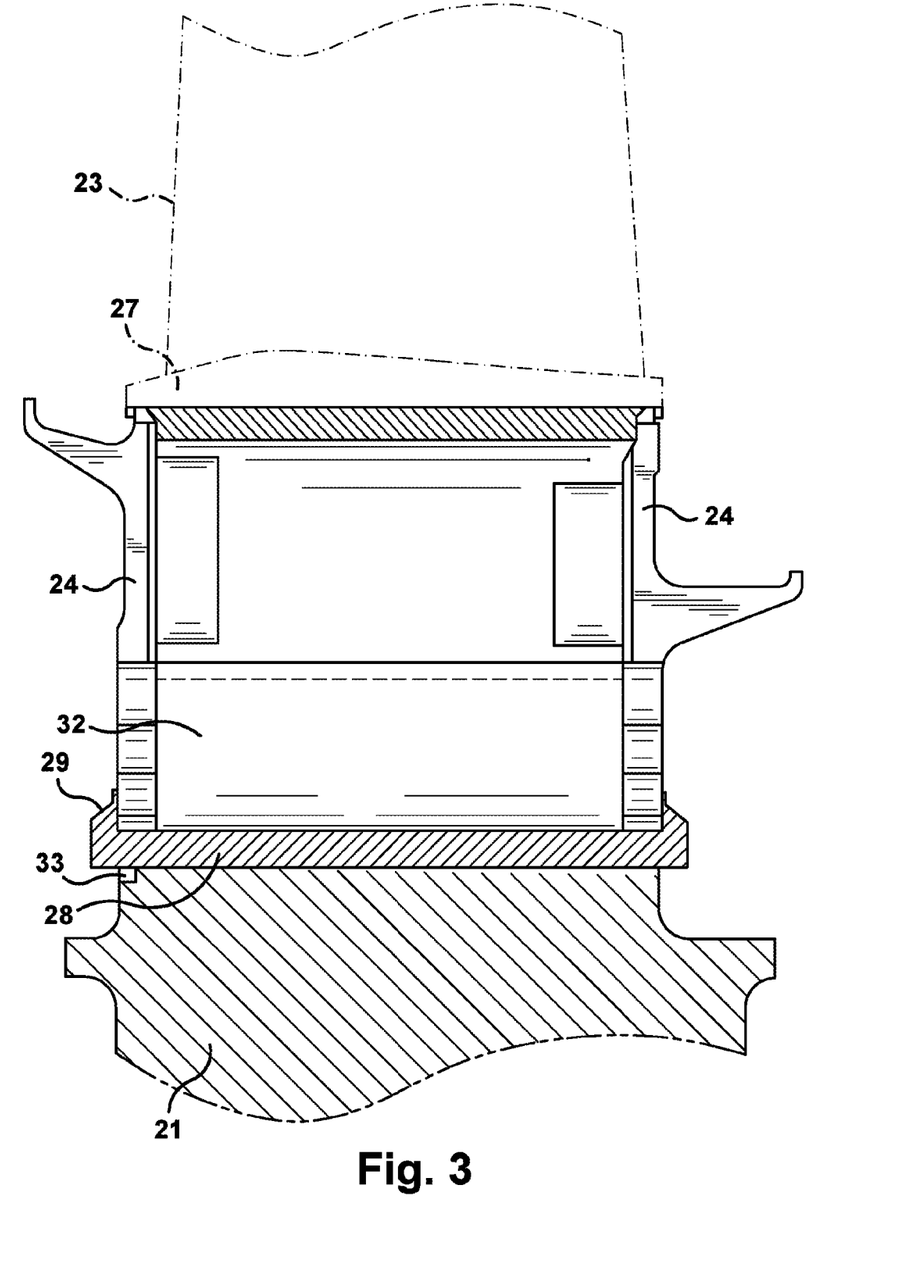
FIG. 3 illustrates an axial cross-sectional view illustrating the inner end of the blade, including the shank and dovetail, with a coverplate applied over the axial end face of the shank and blade dovetail.

FIG. 3 illustrates an axial cross-sectional view illustrating the inner end of the blade, including the shank and dovetail, with a coverplate applied over the axial end face of the shank and blade dovetail. A retention pin 28 is employed to retain the forward and aft coverplates and blade within the wheel slot 22. Pin 28, which may also be referred to as a twist lock device, is cylindrical in cross-section throughout its length. Opposite ends of pin 28 each have a radially outwardly projecting head or flange 29 on the pin 28 which may extend slightly in excess of 180 degrees but forms a flat 30 along one edge, corresponding to a cylindrical surface of the pin 28. The pin 28 resides in the sub-slot 31 and the flange 29 overlie the outer surfaces of the forward and aft dovetails of the coverplates and opposite wheel faces to retain the coverplates against axial displacement relative to the wheel. One of the flanges 29 may be configured to have the flange extend 360 degrees. For example, the downstream flange may extend 360 degrees around the head, whereas the upstream flange extends about 180 degrees around the head.

To install a blade and coverplates on the wheel 21, the pin 28 is first disposed in the sub-slot 31 with the flat end edges 30 of head 29 facing radially outwardly (or up in the drawing) followed by the axially entering dovetail of a blade. Because the dovetail of the blade terminates in a radially inner flat end face, the blade dovetail 32 is received axially within the slot 22 with the bosses and grooves of the slot 22 engaging the complementary grooves and bosses, respectively, of the blade dovetail. The flat end face thus radially overlies the cylindrical surface of the pin 28. A coverplate 24 is then applied to axially overlie the end face of the bucket dovetail and shank. To apply the coverplate, the flange of the coverplate is inserted into the groove below the platform 27. The dovetail 32 is also inserted into the dovetail at the end of the slot 22. The flat at the radial inner end face of the dovetail and the centering groove overlie the cylindrical pin 28. The opposite coverplate is likewise applied to the opposite axial face of the wheel. When both coverplates are applied, the pin 28 is rotated into the position illustrated in FIG. 2 such that the enlarged head(s) 29 of pin/twist lock 28 engage the outer faces of the coverplates and the wheel. A staking groove 33 is also formed along one of the wheel faces and the margins of the head along that face is staked into the staking groove to preclude rotation of the pin 28.

Figure 4:
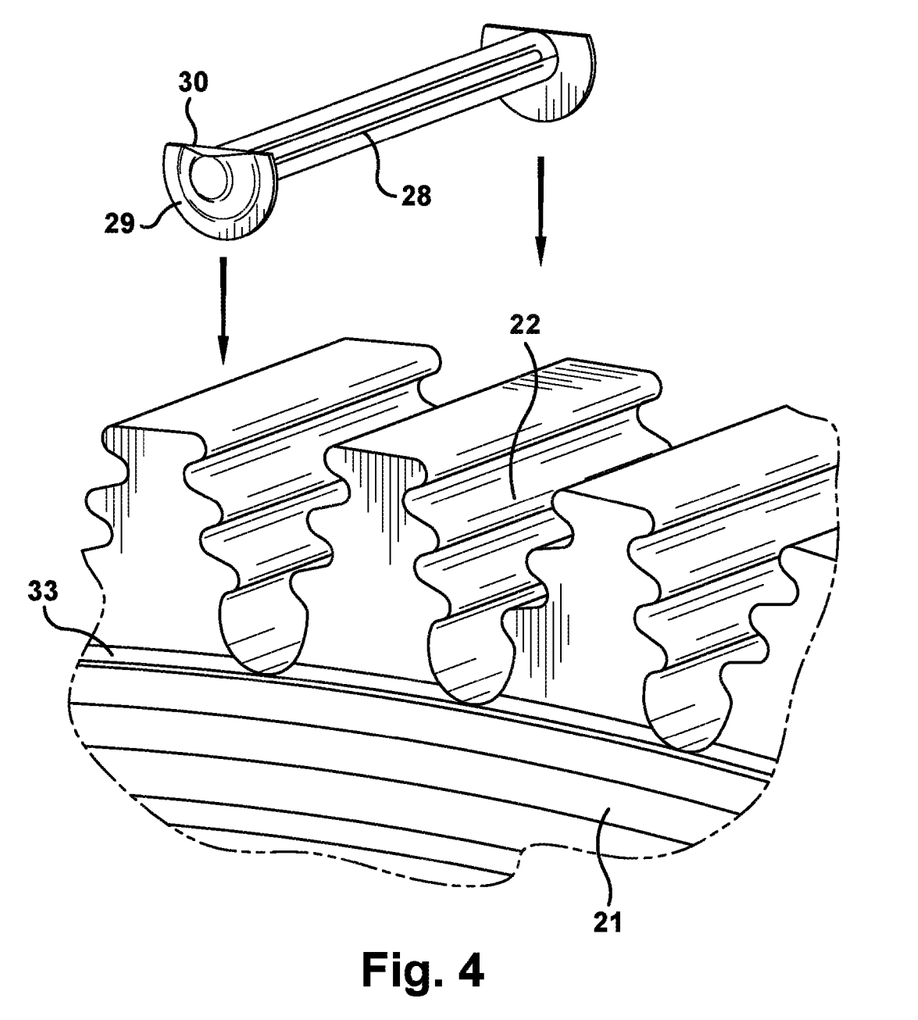
FIG. 4 illustrates a perspective view of the wheel and a retention pin or twist lock device.

FIG. 4 illustrates a perspective view of the wheel 21 and a retention pin or twist lock device 28. The retention pin 28 is oriented with the flat side 30 of the head 29 pointing up (with respect to FIG. 4) or radially outward. Once placed into the bottom of slot 22, the flat side 30 provides clearance so that the blade 23 may be inserted. After the seals 24 are positioned on the forward and aft sides of the blade 23, the retention pin/twist lock 28 can be rotated 180 degrees into the orientation as shown in FIGS. 2 and 3.

Figure 5:
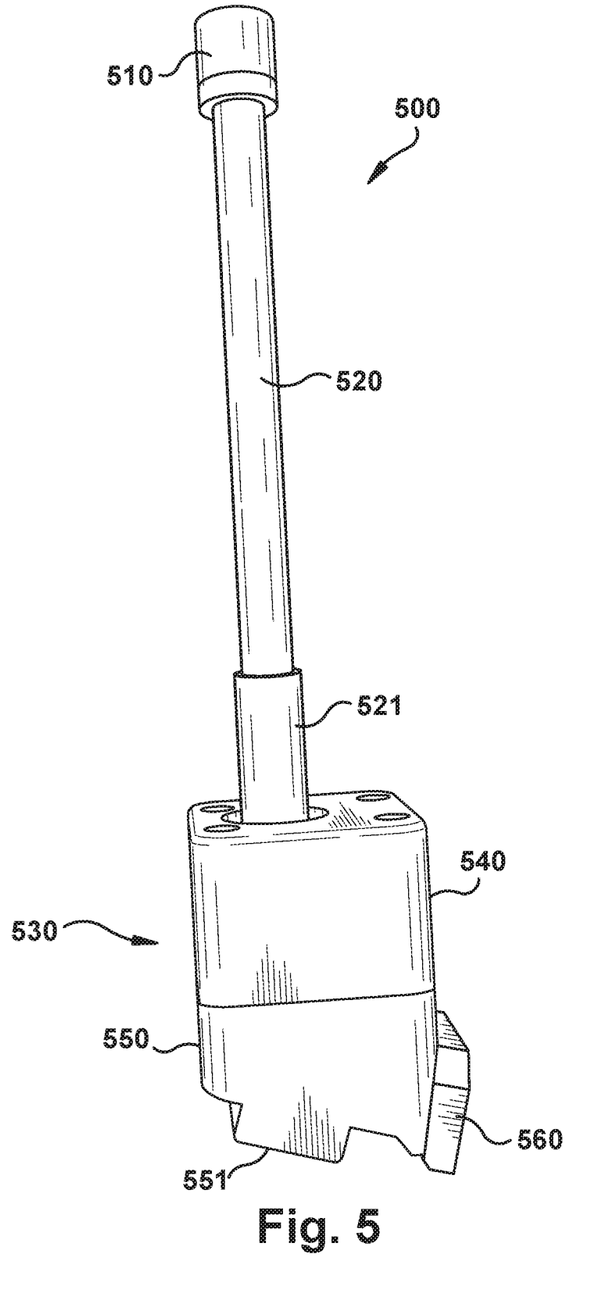
FIG. 5 illustrates a side perspective view of a staking tool, according to an aspect of the present invention.

FIG. 5 illustrates a side perspective view of a staking tool 500 according to an aspect of the present invention. The staking tool 500 is used to stake the heads 29 of the retention pins/twist locks 28 so that two portions of each head 29 are bent (or staked) into the staking groove 33. The staking tool 500 includes a cap 510 connected to a main shaft 520. The main shaft is connected to an assembly 530 via upper shaft 521. The main shaft 520 and upper shaft 521 may be connected together via a threaded connection, or may be formed as one integral member. The assembly 530 is comprised of an upper body 540 and a lower body 550. The lower body includes a shoulder section 551 that is configured to be inserted into a land of a rotor in a turbomachine wheel. Turbomachine wheels have a series of upper and lower lands (e.g., ribs and grooves) which are configured to cooperate with machine components such as seals and/or vanes/nozzles. The shoulder section 551 fits into the lower land (i.e., the "groove" between ribs) and functions as a force reaction point when the cap 510 is struck with a hammer (or other impact/force applying tool). The cap 510 may be connected to the main shaft 520 by a threaded connection (not shown) and the material of the cap may be brass. With this configuration, the cap 510 may be easily replaced when wear occurs due to repeated impacts sustained by blows from a hammer or other suitable tool. The assembly 530 also includes a locator member 560 that is attached to the lower body 550. The locator member is configured to align the punch members (not shown in FIG. 5) with a twist lock device 28 or retention pin.

Figure 6:
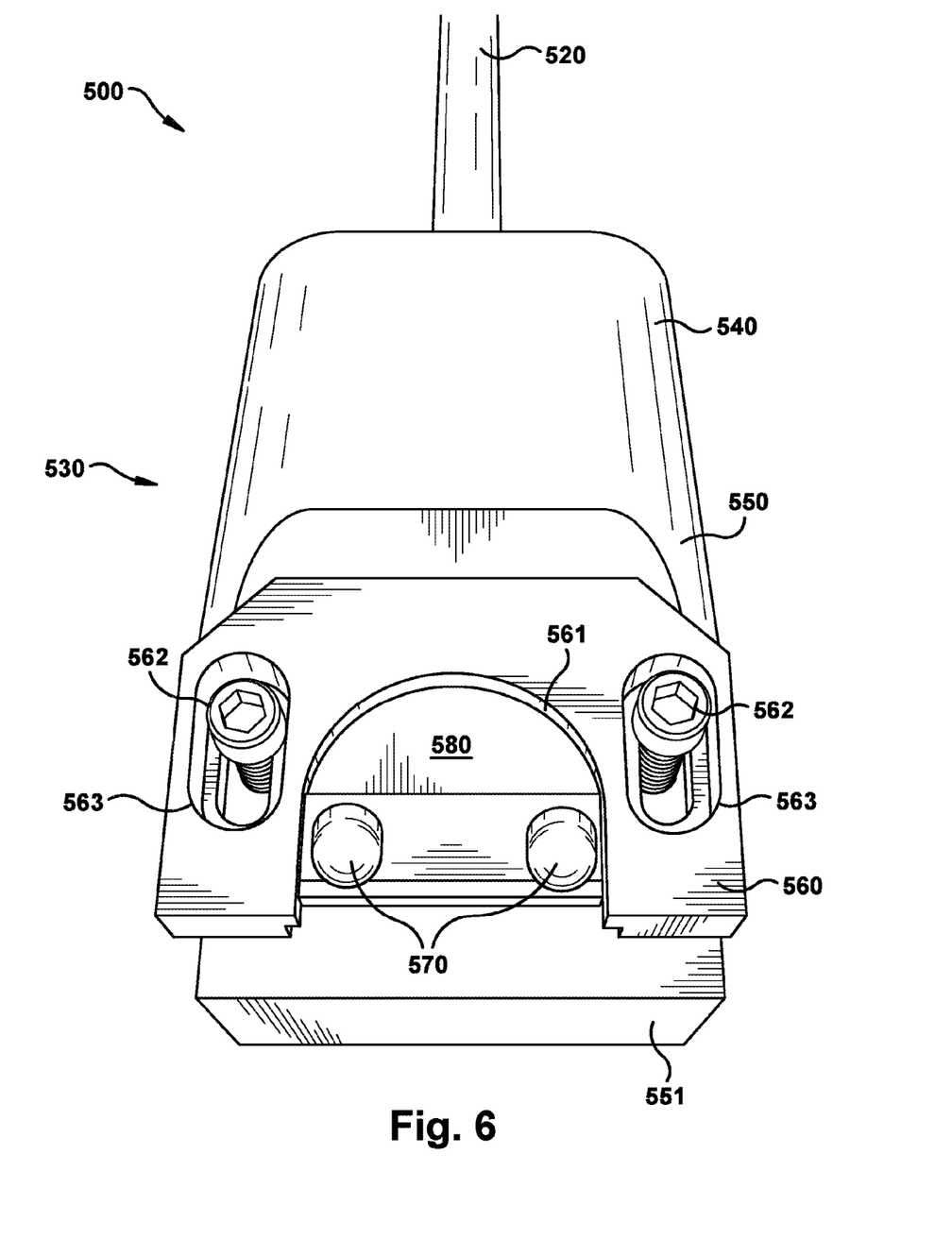
FIG. 6 illustrates a partial and front perspective view of the staking tool, according to an aspect of the present invention.

FIG. 6 illustrates a partial and front perspective view of the staking tool 500. The locator member 560 may be generally U-shaped with a central aperture 561 sized and configured to fit over the head 29. The locator member may be attached to the lower body 550 with fasteners 562. A pair of slots 563, formed in the two legs of the "U", allows the locator member 560 to be adjusted (e.g., up and down with respect to the view shown in FIG. 6) until the desired position is obtained. The lower body 550 also includes two substantially parallel punch members 570. The punch members are located partially in a punch body 580, and extend out and project beyond the punch body 580. The punch members 570 are the elements that are used to contact and stake the respective portions of the head 29.

Figure 7:
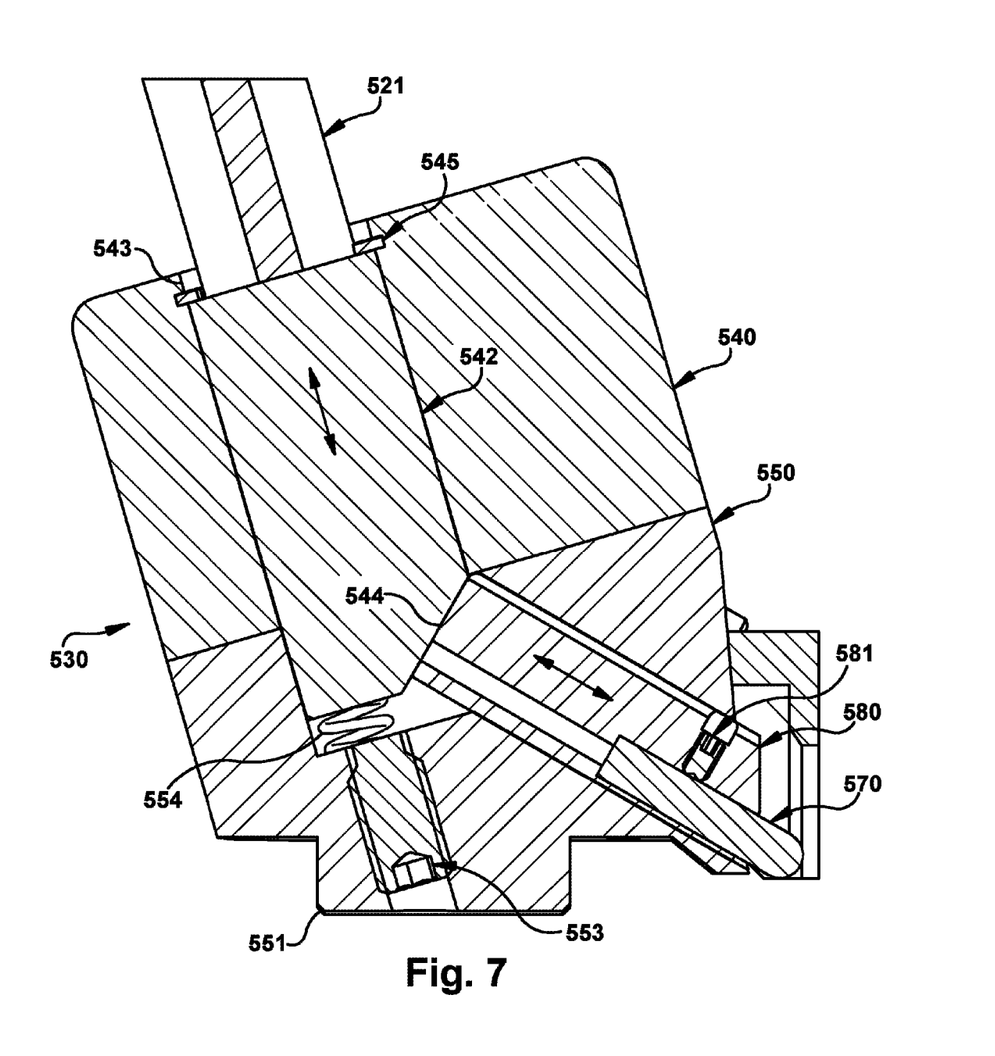
FIG. 7 illustrates a cross section of the staking tool's assembly, according to an aspect of the present invention.

FIG. 7 illustrates a cross section of the staking tool's assembly 530. The upper shaft 521 is connected to a lower shaft 542. For example, the lower shaft 542 may be threadably connected to the upper shaft 521. The upper shaft 521 (or a portion thereof) and the lower shaft 542 can slide or move up and down in an opening 543 in the upper body 540. The lower shaft 542 includes an angled face 544 that is configured to contact the punch body 580. As one example only, the angled face 544 may be angled by about 45 degrees with respect to the adjacent side and/or bottom of the lower shaft 542. In this configuration an angle (e.g., about 45 degrees) is formed between the punch body and the lower shaft, and this angle redirects the direction of the force applied to the cap 510, main shaft 520, upper shaft 520 and lower shaft 542 by about 45 degrees into the punch body 580 and subsequently into the punch members 570. The upper body 540 may also incorporate a snap ring 545 that retains the lower shaft 542 within the upper body 540. The snap ring may be a generally cylindrical or C-shaped element that snaps into a groove in the upper body. This retention element is useful when the main shaft 520 is grasped by a user and the tool 500 is transported, as the main shaft 520 will not undesirably detach from the assembly 530. As shown in FIG. 7, the punch body 580 and the two punch members 570 may be located substantially within the lower body 550, and the lower shaft 542 may be located substantially in the upper body 540.

The shoulder 551 includes a threaded opening for use with a set screw 553, The set screw 553 retains a spring 554 that contacts both the lower body 550 and the lower shaft 542. The set screw 553 biases the lower shaft away from the lower body or punch members 570. For example, in a normal resting state, the lower shaft 542 is pressed up and against the snap ring 545 by the spring 554. When cap 510 is struck with a hammer, the force pushes the lower shaft down and compresses the spring 554 until the bottom of the lower shaft 542 contacts the lower body. The set screw 553 also allows the compression of the spring 554 to be adjusted. To increase compression the set screw is screwed in or tightened, and to reduce compression the set screw is screwed out or loosened. The punch body 580 also includes a set screw 581 that functions to retain the punch members 570 in the punch body. In addition, the shoulder section 551 and lower body 550 may be configured so that the main shaft 520 angles away from the wheel 21 by about 0 to about 25 degrees, about 5 to about 15 degrees, or any suitable angle that facilitates positioning and use of the tool 500.

Figure 8:
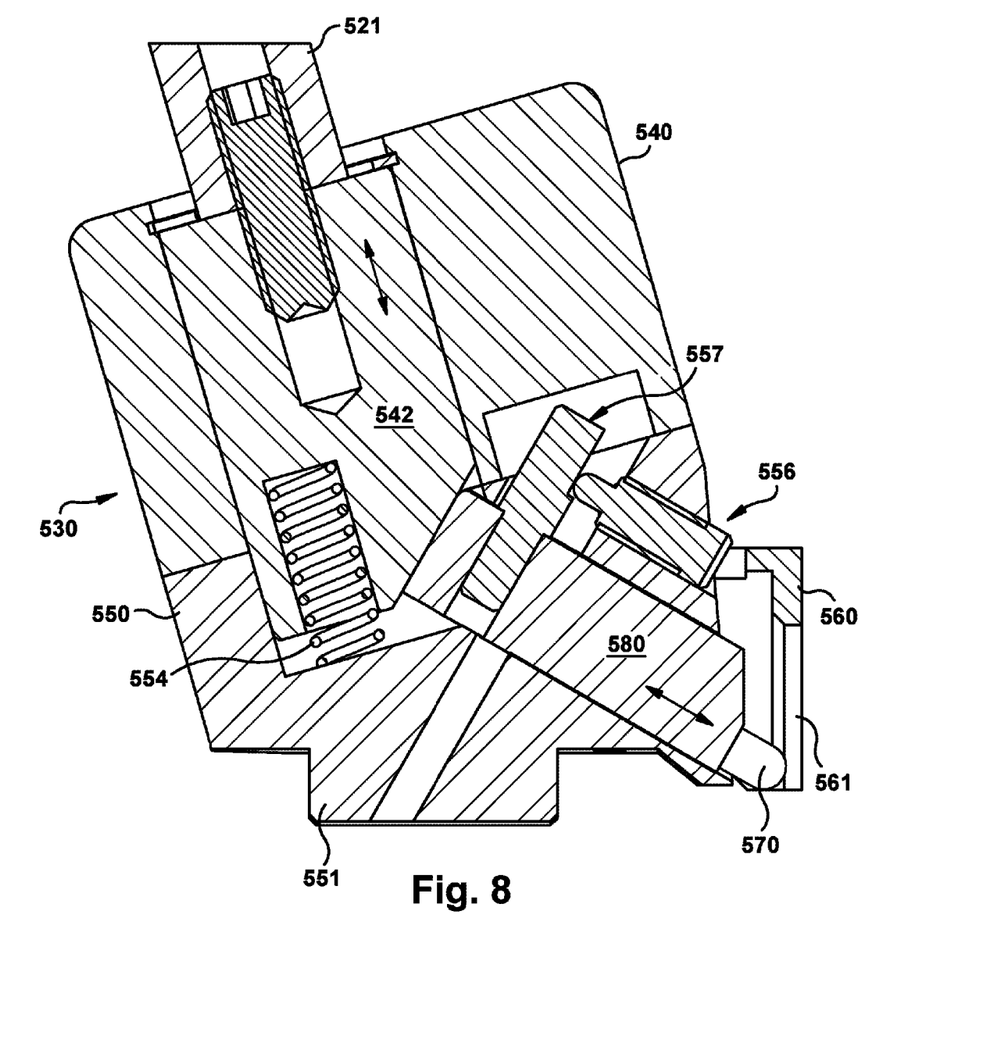
FIG. 8 illustrates a cross sectional view of the staking tool's assembly, according to an aspect of the present invention.

FIG. 8 illustrates another cross section of the staking tool's assembly 530. The upper shaft 521 (and/or main shaft 520) may be connected to the lower shaft 542 with a threaded fastener 545. The punch body 580 is also spring biased towards the lower shaft by a spring plunger 556 and pin 557. The spring plunger pushes the pin towards the lower shaft and also acts as a stop when the pin fully compresses (or bottoms out on) the spring plunger 556. The spring plunger 556 and pin 557 may also function as an adjustable stop to set the length of travel of the punch members 570, in that the spring plunger may be positioned at multiple locations along the threaded hole and/or the pin 557 can be sized with various diameters or shapes.

Figure 9:
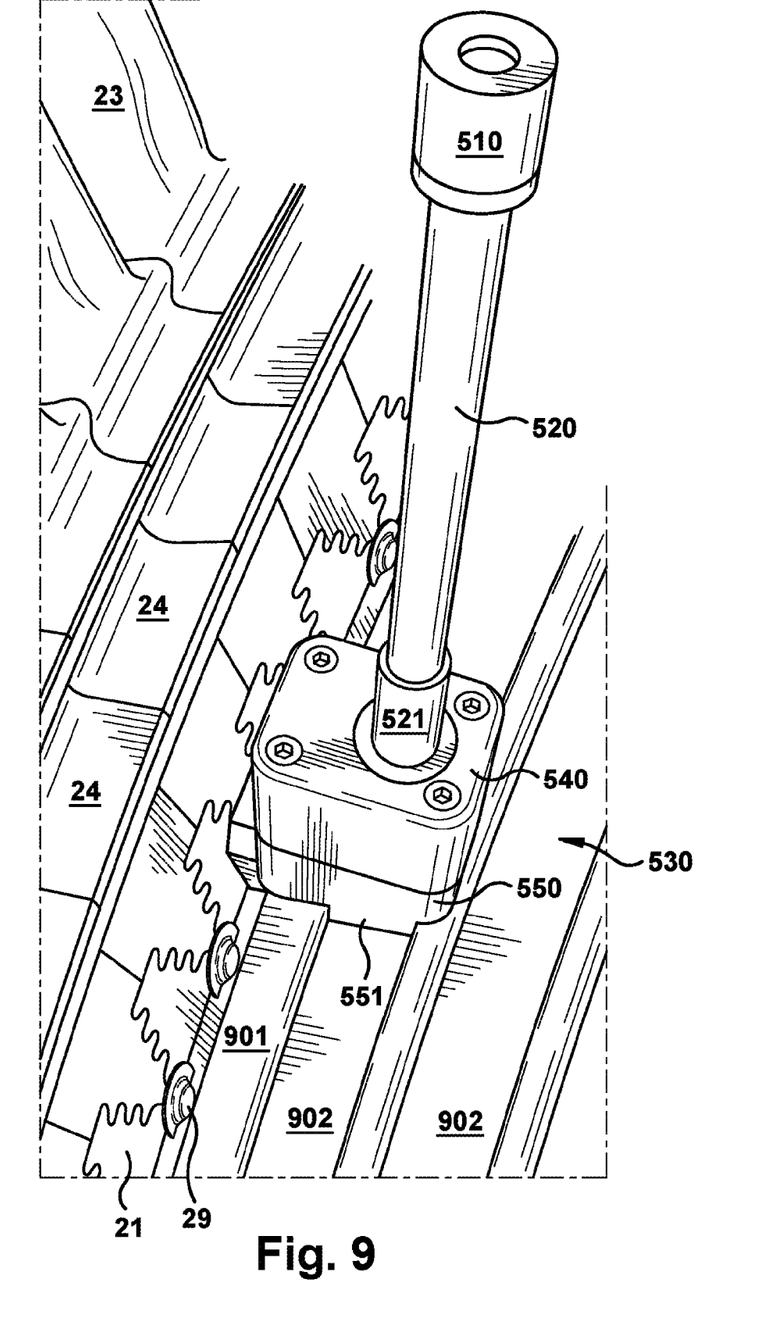
FIG. 9 illustrates a perspective view of the staking tool positioned for use over a twist lock device or retention pin, according to an aspect of the present invention.

FIG. 9 illustrates a perspective view of the staking tool 500 positioned for use over a twist lock device. The rotor 900 includes a series of upper lands 901 and lower lands 902, and the shoulder 551 is placed in one or on one of the lower lands 902 next to the wheel 21. The upper lands 901 may be viewed as ribs, and the lower lands 902 may be viewed as grooves. The wheel 21 may be machined out of the rotor 900 or the wheel may be welded to rotor 900. The shoulder section 551 and lower body 550 may be configured so that the main shaft 520 angles away from the radial facing surfaces of the rotor 900 by about 75 to about 90 degrees, about 80 to about 85 degrees, or any suitable angle that facilitates positioning and use of the tool 500. In other words, the bottom surface of the shoulder section 551 and the interior walls of the opening 543 are offset by an angle of about 75 degrees to about 85 degrees. The angle or "tilt" of the main shaft 520 may facilitate use by a technician, as the angle provides improved clearance for striking the cap 510 with a hammer.

Figure 10:
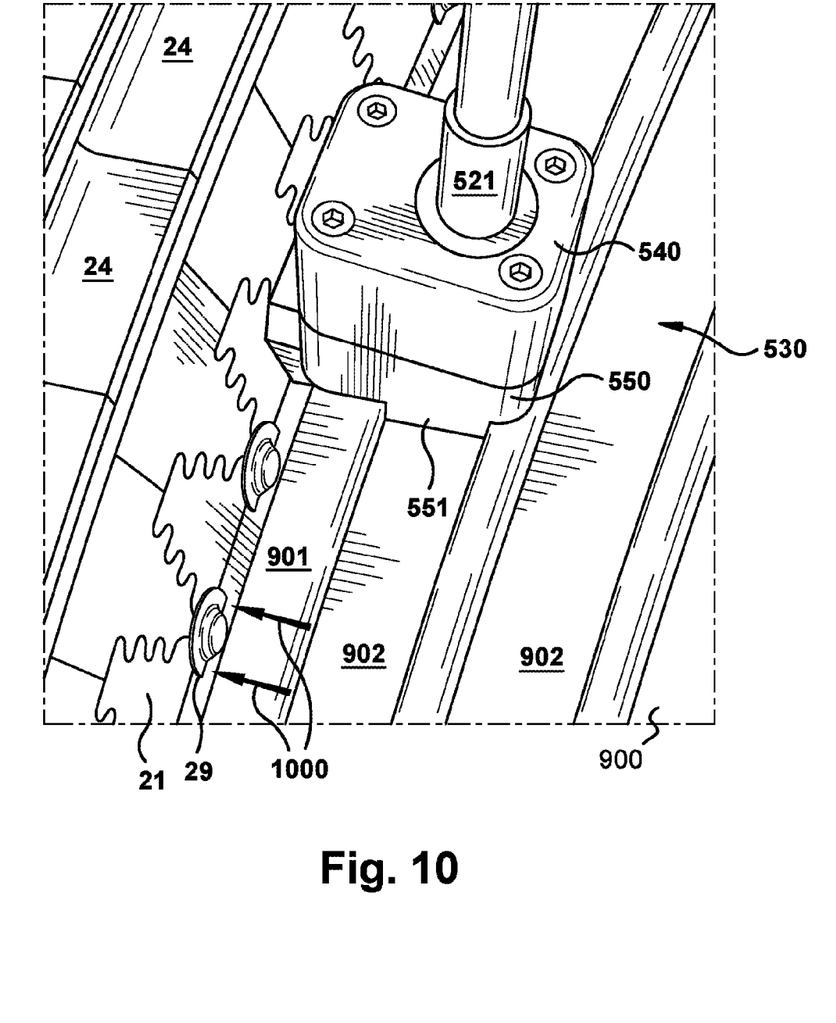
FIG. 10 illustrates an enlarged or zoomed in perspective view of the staking tool positioned for use over a twist lock device, according to an aspect of the present invention.

FIG. 10 illustrates an enlarged or zoomed in perspective view of the staking tool 500 positioned for use over a twist lock device. The staking tool 500 is shown in position to stake the head 29 of a twist lock device 28. The two punch members 570 (not shown in FIG. 10) will stake the head 29 at the locations indicated by the two arrows 1000. This simultaneous and dual staking ensures that two portions of the head 29 are pushed into the staking groove 33, thereby ensuring against unwanted rotation of the twist lock device 28.

Figure 11:
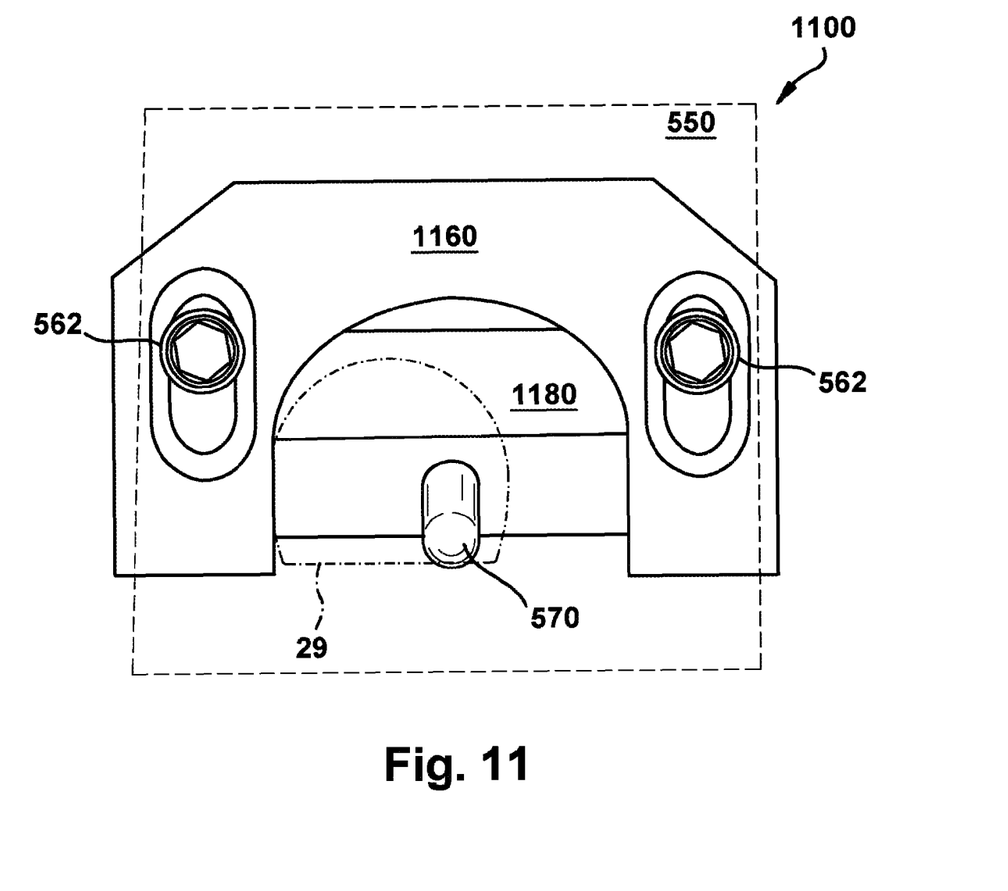
FIG. 11 illustrates a partial front view of a staking tool having a single punch member, according to an aspect of the present invention.

FIG. 11 illustrates a partial front view of a staking tool 1100 having a single punch member. The punch body 1180 is configured to accept one punch member 570. The locator member 1160 may be sized so that when a twist lock head 29 is placed against one side or one leg of the locator member 1160, then the punch member 570 is aligned with one side of the head 29. If a second stake is desired, then the locator member 1160 (and tool 1100) is slid over until the head 29 contacts the opposing leg of the locator member 1160. In this manner, a single punch member 570 can be used to stake the head 29 multiple times.

Figure 12:
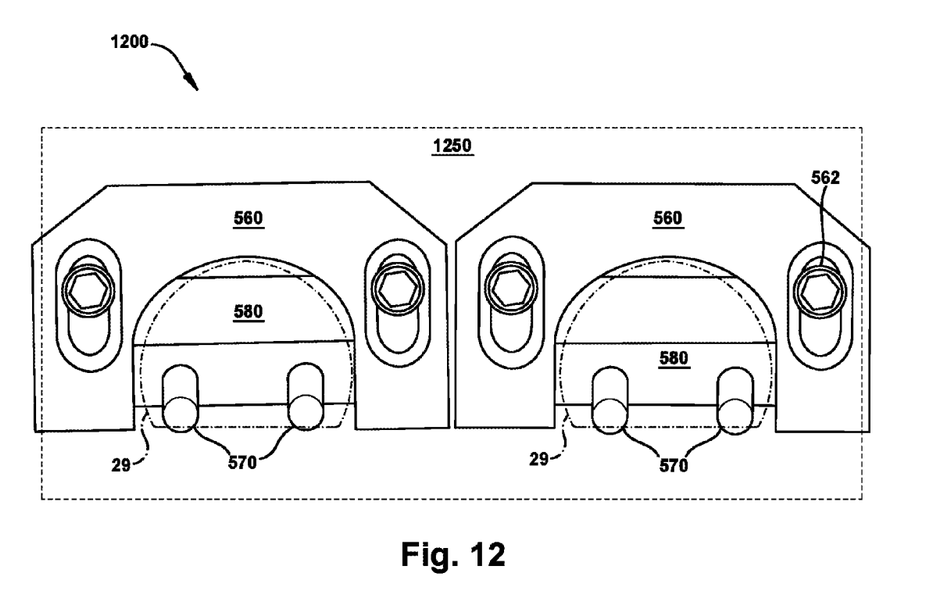
FIG. 12 illustrates a partial front view of a staking tool having four punch members, according to an aspect of the present invention.

FIG. 12 illustrates a partial front view of a staking tool 1200 having four punch members 570. This embodiment allows for the simultaneous staking of two heads 29 at the same time. The two locator members 560, mounted on lower body 1250, are configured to align with two neighboring twist lock heads 29 (shown in phantom). Each punch body 580 contains two punch members 570. A single blow from a hammer can simultaneously stake two heads in a total of four places. It is to be understood that instead of two locator members 560, a single larger locator member (not shown) may be used as long as it is configured to align with (or fit over) two neighboring twist lock heads 29. A single punch body 580 may be used as well. Furthermore, it is to be understood that one, two, four, six or more punch members 570 may be used as desired in the specific application.

The staking tool 500, 1100, 1200 permits a technician to fully swing a hammer when using the tool. The full swing enables the desired force to be applied to the head 29 so that typically only one swing is needed for satisfactory staking. In the past, the limited and confined space next to the wheel 21 and blades 23 made staking the heads 29 very difficult. Further, it was even more difficult to obtain the desired angle on the punch member(s) and effect a blow with a hammer due to the limited space between the neighboring blade stage or the exhaust components. The new staking tool, as described above, solves all the aforementioned problems and provides an effective staking tool yielding high quality stakes on twist lock heads.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A staking tool comprising:
   a punch body;
   a lower shaft;
   an assembly having two substantially parallel punch members, the punch members located partially in the punch body, the punch body located adjacent to the lower shaft, the lower shaft having an angled face configured to contact the punch body so that an angle is formed between the punch body and lower shaft, the angle is about 45 degrees;
   a lower body of the assembly, the punch body and the two punch members are located substantially within the lower body;
   an upper body of the assembly, the lower shaft located substantially in the upper body;
   a main shaft connected to the lower shaft;
   a cap connected to the main shaft;
   a locator member attached to the lower body, the locator member configured to align the punch members with a twist lock device; and
   wherein a blow applied to the cap transfers force to the punch body, and the angled face redirects the direction of the force by the angle.

2. The staking tool of claim 1, further comprising:
   two fasteners;
   wherein the locator member has a general U-shape and the locator member has two legs with slots formed therein, the slots configured for use with the fasteners and the slots enabling a position of the locator member to be adjusted as the slots slide relative to the fasteners.

3. The staking tool of claim 1, the lower shaft comprising a spring configured to contact the lower body, the spring configured to bias the lower shaft away from the punch members.

4. The staking tool of claim 1, the lower body comprising a shoulder section configured for insertion into a land of a turbomachine's wheel.

5. The staking tool of claim 4, wherein the lower body and the shoulder section are configured so that the main shaft angles away from the wheel by about 5 degrees to about 15 degrees.

6. The staking tool of claim 1, wherein the lower body comprises an adjustable stop to set a length of travel of the punch members.

7. A staking tool comprising:
   a punch body;
   a lower shaft;
   an assembly having at least one punch member, the punch member located partially in the punch body, the punch body located adjacent to the lower shaft, the lower shaft having an angled face configured to contact the punch body so that an angle of about 45 degrees is formed between the punch body and lower shaft;
   a lower body of the assembly, the punch body and the at least one punch member located substantially within the lower body;
   an upper body of the assembly, the lower shaft located substantially in the upper body;
   a main shaft connected to the lower shaft;
   a locator member attached to the lower body, the locator member configured to align the at least one punch member with a twist lock device;
   a cap connected to the main shaft; and
   wherein a blow applied to the cap transfers force to the punch body, and the angled face redirects the direction of the force by the angle.

8. The staking tool of claim 7, further comprising at least two substantially parallel punch members.

9. The staking tool of claim 7, further comprising at least four punch members.

10. The staking tool of claim 7 further comprising:
    fasteners; and
    wherein the locator member has a general U-shape and the locator member has two legs with slots formed therein, the slots configured for use with the fasteners and the slots enabling a position of the locator member to be adjusted as the slots slide relative to the fasteners.

11. The staking tool of claim 10, the lower shaft comprising a spring configured to contact the lower body, the spring configured to bias the lower shaft away from the at least one punch member.

12. The staking tool of claim 11, the lower body comprising a shoulder section configured for insertion into a land of a turbomachine's wheel.

13. The staking tool of claim 12, wherein the lower body and the shoulder section are configured so that the main shaft angles away from the wheel by about 5 degrees to about 15 degrees.

14. The staking tool of claim 13, wherein the lower body comprises an adjustable stop to set the length of travel of the at least one punch member.

15. A staking tool comprising:
    an upper body, a shaft located in the upper body;
    a lower body, a punch body and at least one punch member located substantially within the lower body, the at least one punch member located partially in the punch body, the punch body located adjacent to the shaft, the shaft having an angled face configured to contact the punch body so that an angle is formed between the punch body and the shaft; and
    a locator member attached to the lower body, the locator member configured to align the at least one punch member with a device.

16. The staking tool of claim 15, further comprising at least two substantially parallel punch members, or at least four punch members.

17. The staking tool of claim 15, further comprising:
    fasteners; and
    wherein the locator member has a general U-shape and the locator member has two legs with slots formed therein, the slots configured for use with the fasteners, and the slots enabling a position of the locator member to be adjusted as the slots slide relative to the fasteners.

18. The staking tool of claim 15, the shaft comprising a spring configured to contact the lower body, the spring configured to bias the shaft away from the at least one punch member.

19. The staking tool of claim 15, the lower body comprising a shoulder section configured for insertion into a land of a wheel of a turbomachine.

20. The staking tool of claim 19, wherein the lower body and the shoulder section are configured so that the shaft angles away from the wheel by about 5 degrees to about 15 degrees.

21. The staking tool of claim 15, wherein the lower body comprises an adjustable stop to set the length of travel of the at least one punch member.

22. The staking tool of claim 15, the angle being about 45 degrees.

\* \* \* \* \*